United States Patent
Day et al.

(10) Patent No.: US 8,201,230 B2
(45) Date of Patent: Jun. 12, 2012

(54) METHOD AND SYSTEM FOR PROTECTING USER CHOICES

(75) Inventors: Robert F. Day, Bellevue, WA (US);
Sarah E. Schrock, Bellevue, WA (US);
Timothy P. McKee, Seattle, WA (US);
Isaac A. Sheldon, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 907 days.

(21) Appl. No.: 10/783,558

(22) Filed: Feb. 20, 2004

(65) Prior Publication Data
US 2005/0188208 A1    Aug. 25, 2005

(51) Int. Cl.
*G06F 7/04*    (2006.01)
(52) U.S. Cl. ............. 726/6; 726/2; 726/3; 726/4; 726/5; 726/18; 726/21; 382/115; 709/227; 902/3; 718/103
(58) Field of Classification Search ........... 726/2–6, 726/18, 21; 382/115; 713/186; 709/227; 902/3; 718/103
See application file for complete search history.

(56) References Cited

U.S. PATENT DOCUMENTS

| | | | |
|---|---|---|---|
| 6,370,141 B1* | 4/2002 | Giordano, et al. | 370/386 |
| 6,470,454 B1* | 10/2002 | Challener et al. | 726/17 |
| 7,210,158 B1* | 4/2007 | Forler | 725/31 |
| 2002/0095591 A1* | 7/2002 | Daniell et al. | 713/200 |
| 2002/0143961 A1* | 10/2002 | Siegel et al. | 709/229 |
| 2003/0129975 A1* | 7/2003 | Sim | 455/418 |
| 2004/0003279 A1* | 1/2004 | Beilinson et al. | 713/200 |
| 2004/0193606 A1* | 9/2004 | Arai et al. | 707/9 |
| 2004/0199763 A1* | 10/2004 | Freund | 713/154 |
| 2004/0210928 A1* | 10/2004 | Hamzy et al. | 725/31 |

* cited by examiner

*Primary Examiner* — Edan Orgad
*Assistant Examiner* — Roderick Tolentino
(74) *Attorney, Agent, or Firm* — Shook, Hardy & Bacon L.L.P.

(57) ABSTRACT

A system, method, and computer-accessible medium for protecting user choice settings are provided. The system and method provide an application programming interface that uses a security subsystem to unlock, write, and relock the user choice settings to insure that the user's choices are enforced and respected by the applications that attempt to change them in a manner that is verifiable and transparent to the user. The user is notified whenever a change to their user choice settings is made.

27 Claims, 6 Drawing Sheets

METHOD AND SYSTEM FOR PROTECTING USER CHOICES

FIELD OF THE INVENTION

In general, the present invention relates to computer software and user choice settings and, in particular, to systems and methods for controlling modifications to user choice settings.

BACKGROUND OF THE INVENTION

Proprietary software applications have become more aggressive in how they manipulate user choice settings when installed in a user's computer. User choice settings are typically indications of certain user preferences for when and how an application is to operate on their computer. For example, during the installation process for a popular proprietary media player application, users are guided through a series of pop-up windows to set certain user choices, such as whether to make the player the default player for popular media, such as .mp3 files, CDs, DVDs, MPEG and AVI video files, and/or other types of media. Users are further prompted to authorize the player to periodically check their system to maintain their user choice settings, even when the player is not actively being used to play anything. Users who provide that authorization may unwittingly defeat their ability to change preferences afterwards, such as choosing a different media player to play .mp3 files. This is because the previously installed player periodically reverts to the user choice settings that the user set during the initial installation. Any changes to the user's choices that the user set afterward using a different media player are lost. If both media players employ the same aggressive tactic of periodically checking the system to maintain the user choices set for that player, the results can be unpredictable, with one media player set as the default player some of the time, and the other media player set as the default player some of the time. Needless to say, this presents users with a very confusing and annoying situation. The only solution is to uninstall the offending media player or to reinstall the player to remove the authorization to periodically maintain the user's choice settings for that player. Even reinstallation of the application may not correct the problem if the installation procedure is not followed properly, or if, as sometimes happens, the application automatically changes certain settings without giving the user a way to opt out of the changes.

In the context of the Windows® operating system, the user choices are typically set by storing those choices in the Windows® registry. The Windows® registry is a central hierarchical database used in Microsoft Windows® operating systems to store information necessary to configure the systems for one or more users, applications, and hardware devices. Applications, such as media players, store user preferences in registry data generally referred to as registry keys. The operating system uses the current values of the registry keys to determine how to handle certain events. For instance, using the above media player example, the operating system interrogates the Windows® registry keys relating to .mp3 files in the event that the user activates an .mp3 file in order to determine which media player to choose to play the file. Another example is when a browser application interrogates the Windows® registry to determine which Web page to display as the default home page when the user first activates the browser.

While the ability to store user choice settings in the Windows® registry is a convenient service of the Windows® operating system, the registry itself is, unfortunately, not secure. Applications are able to change the values of keys in the registry to suit their goals. Thus, competing applications often step on one another, resetting the values of the same keys, and thereby resetting the corresponding user choice settings that those keys represent, without the user's knowledge or consent.

SUMMARY OF THE INVENTION

To overcome the above-described problems, a system, method, and computer-accessible medium for modifying user choice settings are provided. The system and method provide a user choice setting process that permits applications to safely modify user choice settings in a manner that is verifiable and transparent to the user. The system and method operate to advantageously enforce and protect user choice settings and to deter applications from modifying those settings without explicit user approval.

In accordance with one aspect of the present invention, user choice settings are stored as protected values. A protected value is an object that may be secured by a corresponding access control indicator that has been initialized to only allow the user to read but not write the value in accordance with an existing security subsystem in which the access control indicator operates. Applications request modifications to the user choice settings by calling the user choice setting process to obtain approval from the user. Upon receiving approval, the user choice setting process first modifies the corresponding access control indicator of the protected value to allow the user to write the value. Once the corresponding access control indicator of the protected value has been modified, the user choice setting process is able to modify the user choice setting as requested. Before returning control of the protected value to the system, the user choice setting process restores the corresponding access control indicator to again only allow the user to read but not write the newly modified protected value.

In accordance with another aspect of the present invention, the user choice setting process generates an approval user interface to display to the user their user choice settings, and to receive from the user an input to approve the application's request to change those settings. Should the user not approve the application's request, the user choice setting process terminates the request and does not modify the corresponding access control indicator of the protected value, nor does it modify the protected value.

In accordance with a further aspect of the present invention, the user choice setting process modifies the corresponding access control indicator by providing to the user the rights to modify the access control indicator in accordance with the security subsystem in which the access control indicator operates. Alternatively, the user choice setting process modifies the corresponding access control indicator by providing to the user ownership of the protected value object that the access control indicator secures, where ownership of the object automatically grants to the user rights to modify the corresponding access control indicator in accordance with the security subsystem in which the access control indicator operates. In a variation on this alternative, the user choice setting process modifies the corresponding access control indicator by allowing the user to temporarily take ownership of the protected value object that the access control indicator secures in accordance with the security subsystem in which the access control indicator operates, thereby temporarily granting to the user the right to modify the corresponding access control indicator in accordance with the security subsystem in which the access control indicator operates.

In accordance with yet another aspect of the present invention, the user choice setting process automatically generates a change notification to the user once the protected value has been modified, whether the modification to the protected value was made in response to an approved request from an application or whether the modification to the protected value was made by an unauthorized application or any other entity outside of the user choice setting process.

In accordance with yet other aspects of the present invention, a computer-accessible medium for modifying user choice settings is provided. The computer-accessible medium comprises data structures and computer-executable components comprising an application programming interface for permitting applications to safely modify user choice settings in a manner that is verifiable and transparent to the user. The data structures define protected value objects and access control indicator data in a manner that is generally consistent with the above-described method. Likewise, the computer-executable components are capable of performing actions generally consistent with the above-described method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF A PREFERRED EMBODIMENT

The following discussion is intended to provide a brief, general description of a computing system suitable for implementing various features of the invention. While the computing system will be described in the general context of a personal computer usable in a distributed computing environment, where complementary tasks are performed by remote computing devices linked together through a communication network, those skilled in the art will appreciate that the invention may be practiced with many other computer system configurations, including multiprocessor systems, minicomputers, mainframe computers, and the like. In addition to the more conventional computer systems described above, those skilled in the art will recognize that the invention may be practiced on other computing devices, including laptop computers, tablet computers, personal digital assistants (PDAs), and other devices upon which computer software or other digital content is installed. In particular, although the description of the computing system suitable for implementing various features of the invention will include numerous references to the Windows® operating system and security subsystem and the Windows® registry, those skilled in the art will recognize that the invention may be practiced in the context of other operating systems and security subsystems and in the context of other ways of storing user choice settings other than in a Windows® registry.

While aspects of the invention may be described in terms of applications and interfaces executed by an operating system in conjunction with a personal computer, those skilled in the art will recognize that those aspects also may be implemented in combination with other program modules or subsystems, such as a security subsystem of the operating system. Generally, program modules include routines, programs, subprograms, subroutines, interfaces, components, data structures, etc., which perform particular tasks or implement particular abstract data types.

For the sake of convenience, much of the description herein is provided in the context of the Microsoft Windows® operating system and associated security subsystem. However, the references to specific types of protected values and access control indicators in the context of the Windows® operating system, such as the references to the Windows® registry and the registry keys, and the references to access control lists (ACLs) and access control entries (ACEs) are only illustrative and do not serve to limit the general application of the invention.

Figure 1:
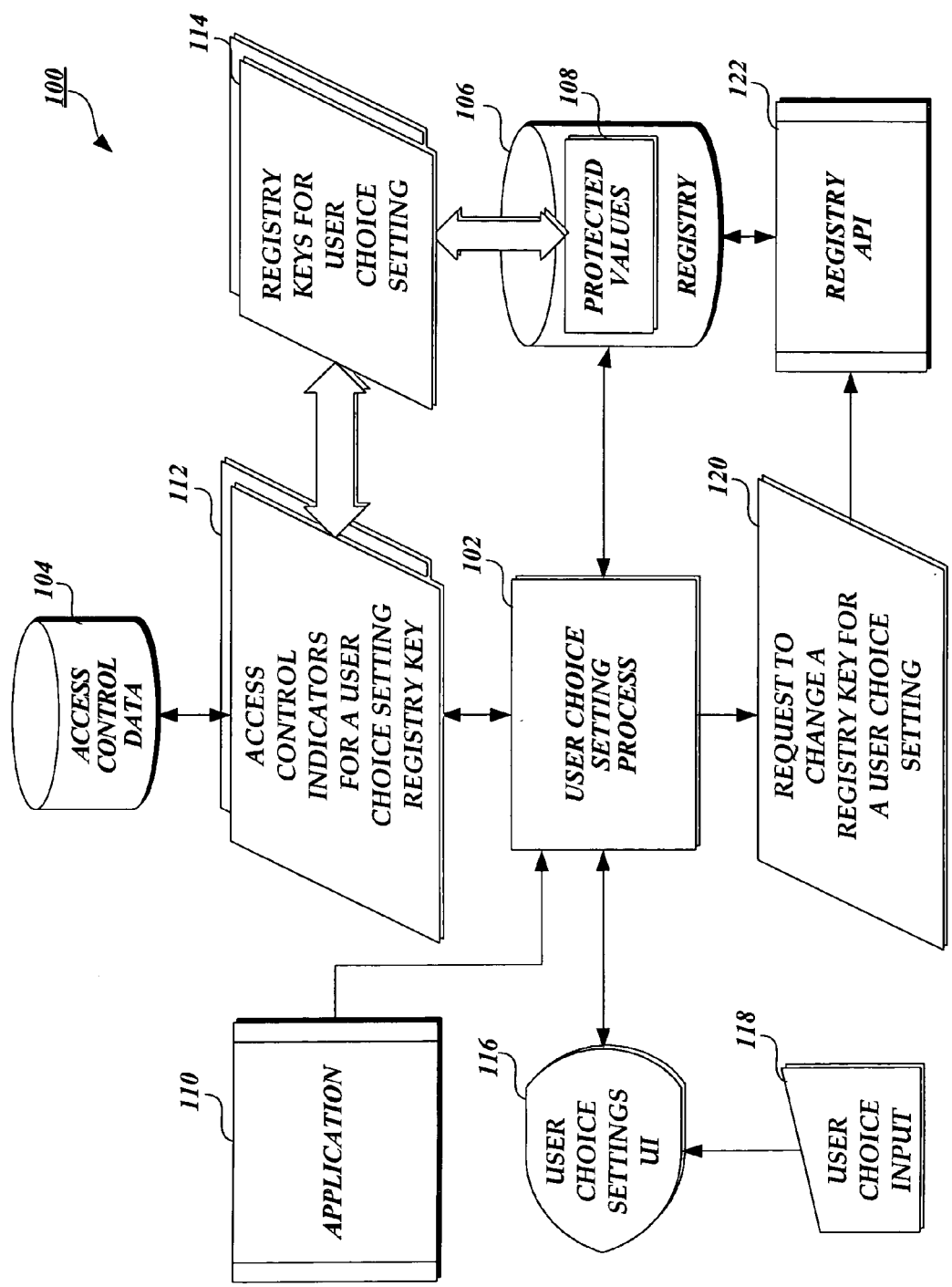
FIG. 1 is a block diagram overview of an exemplary system to protect user choice settings and one suitable operating environment in which user choice settings may be protected, in accordance with an embodiment of the present invention.

FIG. 1 is a block diagram overview of an exemplary system to protect user choice settings and one suitable operating environment in which user choice settings may be protected in accordance with an embodiment of the present invention. As shown, the operating environment includes a user choice setting process 102 that operates alone or in conjunction with other programs or interfaces, such as the Windows® registry application programming interface (API) 122, to control the modification of protected values 108 that represent various protected user choice settings for when and how an application 110 is to operate in a user's computer. In one embodiment, the user choice setting process 102 may be implemented as an application programming interface (API) that is capable of being called by applications 110 in a uniform manner whenever those applications want to request authorization to change protected user choice settings. In an alternate embodiment, the process 102 may be incorporated into any application or other program that wants to safely modify user choice settings.

The protected user choice settings include, among others, settings where an application is chosen to handle a certain event (by default or not), as well as settings that alter the behavior of access points to applications. In an embodiment implemented in the Windows® operating system, the protected settings may include those that change the look of the Windows® desktop experience. Table 1 below lists some examples of the types of user choice settings that may be protected.

TABLE 1

| Protected User Choice Settings |
|---|
| File associations |
| Autoplay settings |
| Start menu contents |
| Registered clients, e.g., Web browser, e-mail client, media player, instant messaging client, virtual machine for Java |

TABLE 1-continued

Protected User Choice Settings

Protocol handlers
MIME type handlers
Task associations
Internet Explorer home page
Reset Web settings
Sidebar settings In one embodiment, the protected values 108 are implemented as the values of keys 114 in the Windows® registry 106 of the Windows® operating system. A key 114 for a user choice setting in the registry 106 may include a string (not shown) indicating that it represents a user choice setting and should not be changed except as authorized by the user choice setting process 102. In one embodiment, the string may include a reference to a document or other text (not shown) that includes instructions on how to use the user choice setting process 102 to properly modify a user choice setting implemented as a key 114 in the registry 108.

In one embodiment, the registry keys 114 for user choice settings function as objects that are protected by one or more access control indicators 112. The access control indicators 112 restrict which users or entities can access the protected object, i. e. , the registry key 114, and the indicators further specify how that access is restricted. Among other restrictions, the access may be restricted to only allow read access, where the protected value 108 of the key 114 may be read but not written, or may be unrestricted, i. e. the access may include write access to allow modification of the protected value 108 stored in the key 114.

In one embodiment, the access control indicators 112 are implemented as access control entries (ACE) organized into an access control list (ACL) stored in an access control data repository 104. The ACL is defined as a list of security protections that apply to an object where the object can be a file, process, event, or anything else having a security descriptor in accordance with the security subsystem of the Windows® operating system. In this case, the object is the registry key 114, but in other embodiments it may be any object that contains the protected value 106. An ACE of an ACL contains a set of access rights and a security identifier (SID) that identifies a trustee—in this case a user—for whom the rights are allowed, denied, or audited. The operation of ACLs and ACEs in the security subsystem of the Windows® operating system are known in the art and will not be further described except as they pertain to the description of embodiments of the present invention.

In operation, an application 110 interfaces with the user choice setting process 102 to generate and/or process a request 120 to change a protected value 108 for a user choice setting 120. The user choice setting process 102 is responsible for generating a user choice UI 116 to display to the user the current user choice settings as represented by the current protected values 108. In one embodiment, the current user choice settings are displayed along with the user's other choices, and the user choice setting process 102 is further responsible for receiving from the user a user choice input 118 to approve or decline the request by the application 110 to modify the user choice setting(s). An example of a user choice UI 116 is described in further detail in FIG. 5 below and, in some embodiments, may be generalized to include the display of multiple user choice settings represented by multiple protected values 108 associated with one or more applications 110 running concurrently on the user's computer.

In one embodiment, upon receipt of a user choice input 118 that approves the application's request, the user choice setting process 102 is responsible for modifying the protected value (s) 108 in question in accordance with the user's preferences as communicated by the application 110, or via further user choice input 118 entered in response to the user choice UI 116. Before modifying the protected values 108, the user choice setting process 102 first modifies the access control indicators 112 to the corresponding objects that contain the protected values 108, in this case the registry keys 114, in order to unlock the user choice settings that the application has requested to modify. Specifically, the user choice setting process 102 modifies the access control indicators 112 to allow the user to write to the corresponding registry keys 114. In the context of the Windows® operating system and associated security subsystem, modifying the access control indicators 112 may be accomplished in a number of different ways without departing from the scope of the claims that follow. For example, in one embodiment, modification entails giving the user the right to modify ACLs that secure registry keys 114 that contain protected values 108, e. g. to change read-only access to write access, and vice versa. In an alternate embodiment, the user choice setting process 102 may give the user ownership of objects being secured, i. e. , the registry keys 114, since having ownership of an object enables the owner to modify the corresponding ACL as needed. In yet another variation of the embodiment, the user choice setting process 102 enables the user to take temporary ownership of the objects being secured, during which time the "owner/user" may temporarily modify the corresponding ACL as needed.

In one embodiment, once the ACL (or other access control indicator 112) has been modified to permit the user to write to or otherwise modify the protected value 108, the user choice setting process 102 is further responsible for the actual modification of the protected value—in this case, updating the registry keys 114. Afterward, the user choice setting process 102 is further responsible for restoring the previous restrictions for reading and writing the protected values 108—in this case, changing the access control indicators 112 to restore the system write/read only restrictions that prevent the user and application 110 from writing to the objects containing the protected values 108.

In view of the above-described block diagram overview, the system and method for protecting user choices advantageously protects a group of settings so that applications are deterred from tampering with the user's choices and settings, and encouraged to respect user's preferences on how and when applications operate on the user's computer.

Figure 2:
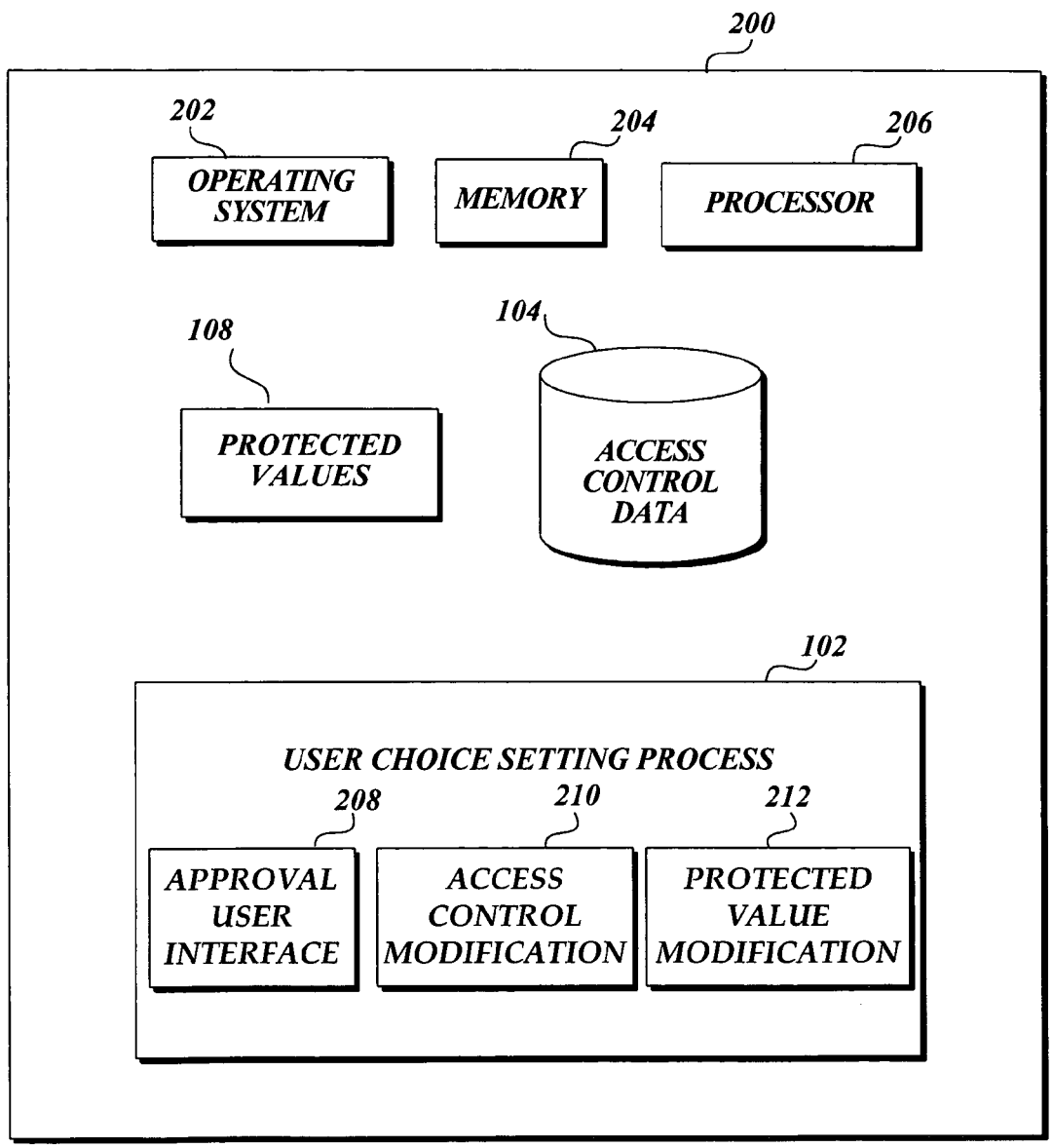
FIG. 2 is a block diagram depicting in further detail an arrangement of certain components of the system to protect user choice settings illustrated in FIG. 1, and in accordance with an embodiment of the present invention.

FIG. 2 illustrates certain exemplary computing components that are responsible for the operation of the system to protect user choice settings 100, shown in FIG. 1. The computer components are installed on computing device 200 and include, among others, the stored protected values 108, the access control data 104, and a user choice setting process 102.

In one embodiment, the logic implemented by the user choice setting process 102 may be functionally organized into one or more processes. For the sake of illustration, those processes may include an approval user interface process 208, access control modification process 210, and a protected value modification process 212. It is understood, however, that the logic may be organized into other processes without departing from the scope of the claims that follow. For example, in one embodiment, the user choice setting process 102 may be implemented as an application programming interface or incorporated directly or indirectly into an application 110, either during coding or during execution, in an internal program function, an external function residing in a program library, a code segment, or other programming module.

In the illustrated embodiment, the approval user interface process 208 is responsible for responding to user inquiries to change a user setting, and includes obtaining the current protected values 108, if any, and displaying those protected values to the user along with their other options. The approval user interface process 208 is further responsible for generating the user choice settings user interface 116 to display the current values of the protected values 108 and to receive an input from the user approving or disapproving an application's request to change the protected values.

The access control modification process 210 is responsible for locking and unlocking the objects that contain the protected values 108. Unlocking the objects is accomplished by modifying the access control indicators 112 to allow the user to write to the protected values 108. This includes taking temporary ownership of the objects that contain the protected values 108, e. g. , the registry keys, and giving the user temporary write access. The access control modification process 210 is further responsible for restoring the access control indicators 112 back to their previous states, i. e. , locking the registry keys by removing the write access and returning to read-only access, after determining that the protected value has been successfully modified.

The protected value modification process 212 is responsible for actually modifying the protected values once they have been unlocked by the access control modification process 210. The protected value modification process 212 may be implemented using other existing APIs to modify values, such as using a Windows® registry API 122 or other Windows® registry function to update an unlocked registry key 114. Alternatively, the user choice setting process 102 may update the unlocked protected value directly. The protected value modification process 212 may also be responsible for notifying the user whenever a protected value has been modified. For example, in one embodiment, the protected value modification process 212 automatically generates a change notification to the user once the protected value has been modified, whether the modification to the protected value was made in response to an approved request from an application 110, or whether the modification to the protected value was made by an unauthorized application or any other entity outside of the user choice setting process 102.

In the illustrated embodiment, the computing device 200 in which the exemplary computing components are shown, also include an operating system 202 that provides executable program instructions for the general administration and operation of the device 200. Suitable implementations for the operating system 202 are known or are commercially available, and are readily implemented by persons having ordinary skill in the art, particularly in light of the disclosure herein. Those of ordinary skill in the art will recognize that the computing device 200 will also typically employ a memory 204 and processor 206 in which program instructions are stored and executed for operation of the processes that comprise the system 100 to protect user choice settings. For example, the memory 204 may include computer program instructions for implementing the user choice setting process 102 that operates in cooperation with the protected values 108 and access control data 104 to protect user choice settings in accordance with an embodiment of the invention. Likewise, the memory 204 may include other executable program instructions, such as instructions for maintaining and updating the registry 106, operating the applications 110, and responding to requests received from applications 110.

Figure 3A:
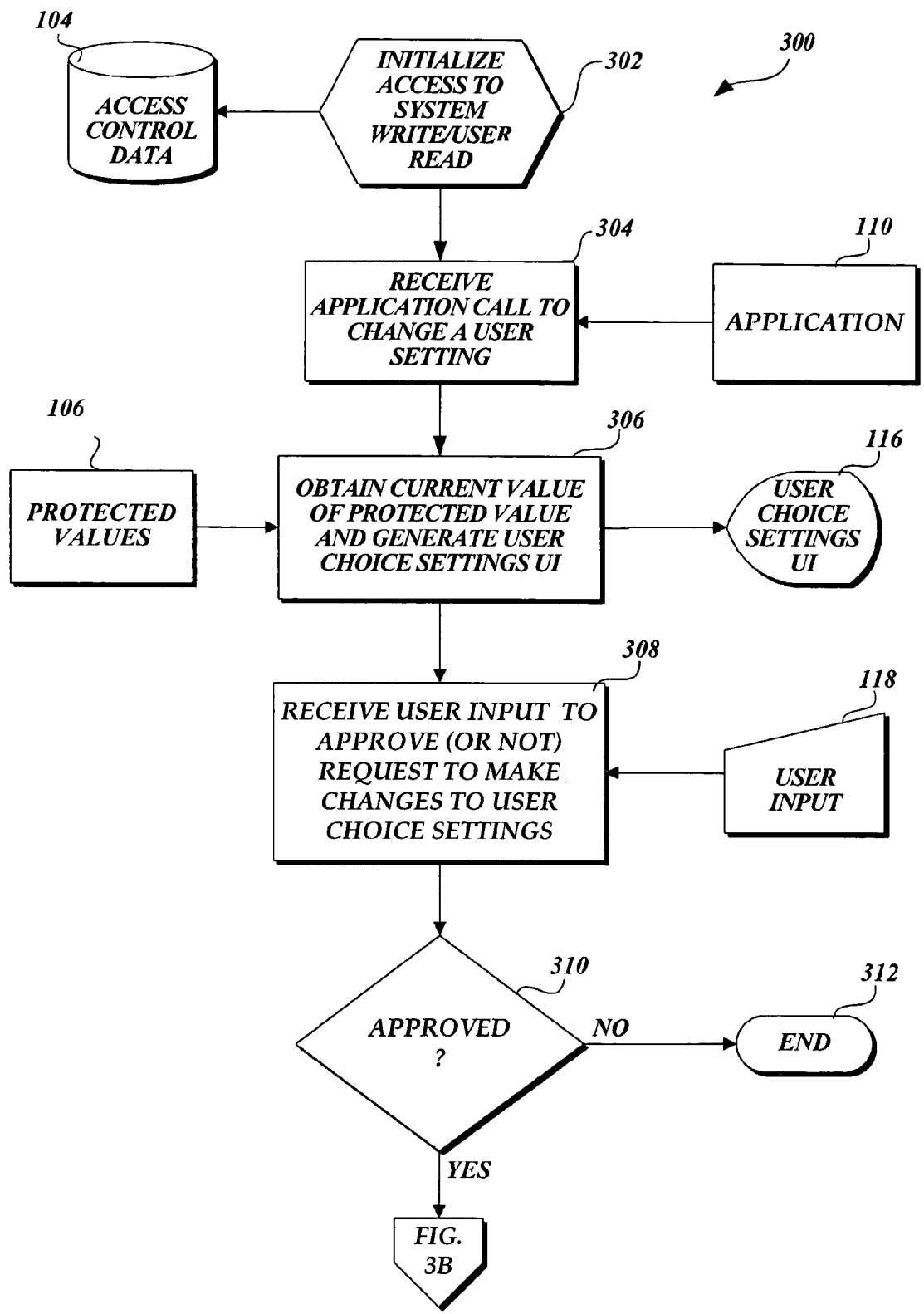
FIGS. 3A-3B are flow diagrams illustrating the logic performed by a method to protect user choice settings in conjunction with the system illustrated in FIGS. 1 and 2, and in accordance with an embodiment of the present invention.
Figure 3B:
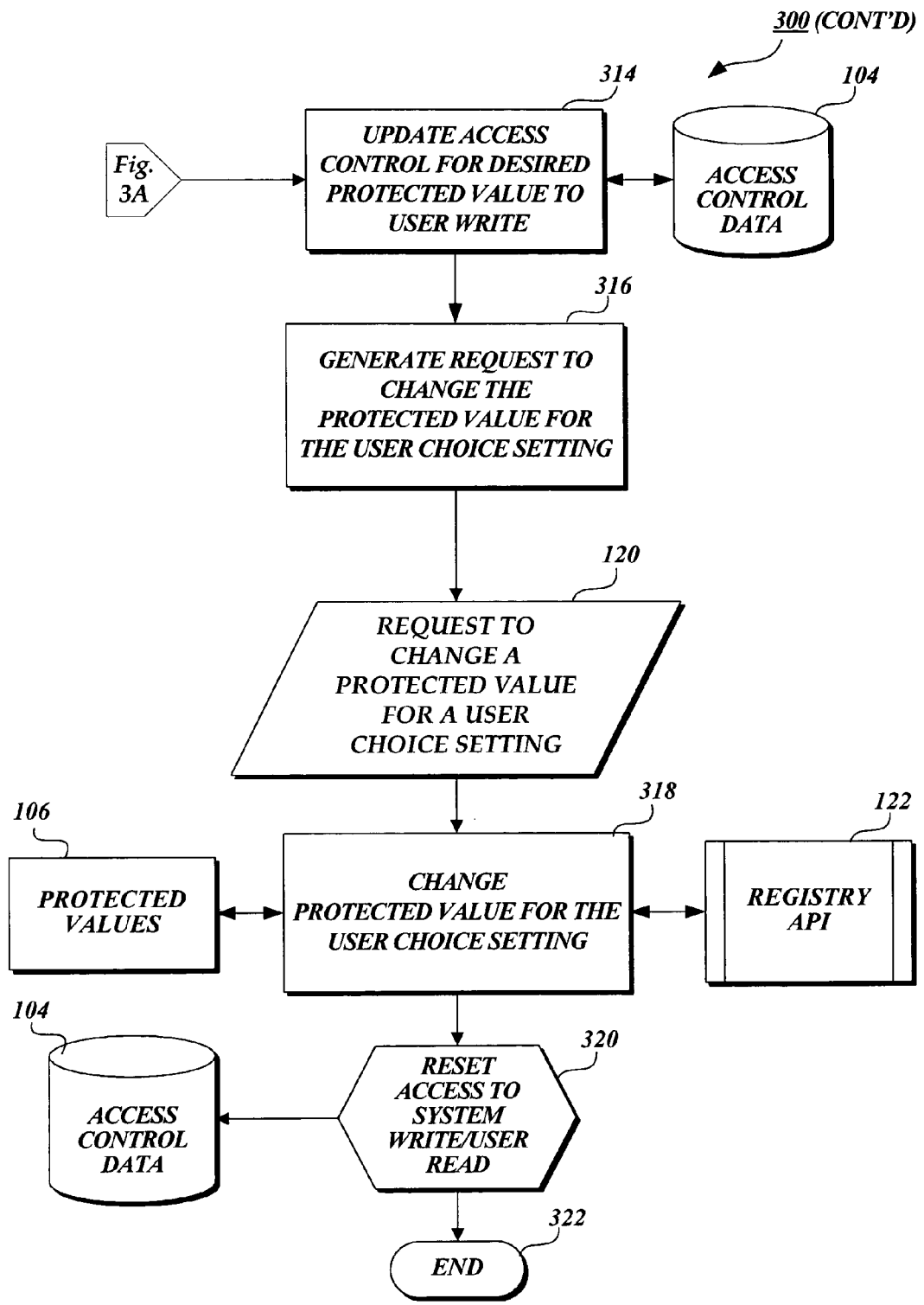

FIGS. 3A-3B are flow diagrams illustrating the logic 300 performed by a method to protect user choice settings in conjunction with the system 100 illustrated in FIGS. 1 and 2, and in accordance with an embodiment of the present invention. Beginning with the preparatory process 302, the system 100 initializes access to the protected values 108 by setting the access control data 104 to allow only the operating system 202 to write to the objects that contain the protected values, and restricting the users to read-only access, i. e. , locking the objects that contain the protected values. In one embodiment, the objects are registry keys 112 that are automatically locked the first time a user attempts to modify the protected values using the user choice setting process 102.

Processing continues at processing block 304 when the user choice setting process 102 receives a call or other type of request from an application 110 to change a user setting. In one embodiment, the user choice setting process 102 obtains the current value of the protected value 108 from a registry 106—for example, reading the current value of a registry key 112 that is the object containing the protected value. The process 102 further generates a user choice setting UI 116 to display the current value to the user and to obtain his or her approval of the request by the application to change the user settings, i. e. , to modify the protected values 108 that represent the user choice settings.

Once the user choice settings UI 116 has been generated, the process 102 receives the user input 118 to approve or not approve the request to make changes to the user choice settings. At decision block 310, the process 102 determines whether the user input 118 indicates that the request has been approved or not approved. If the request has not been approved, then the process 102 terminates any efforts to change the protected values 108 at termination oval 312. On the other hand if the request has been approved, then the process 102 continues at process block 314, illustrated in FIG. 3B.

At process block 314 illustrated in FIG. 3B, the user choice settings process 102 first modifies the access control data 104 that controls access to the desired protected value 108 to allow the user to write to the protected value. As previously described, this may be accomplished in a number of ways, depending on the security subsystem employed by the system 100. For example, in one embodiment, the process 102 employs a security subsystem that gives the user the right to modify ACLs that secure registry keys 114 that contain protected values 108, e. g. , to lock and unlock protected values by changing read-only access to write access and vice versa. In an alternate embodiment, the user choice setting process 102 may give the user ownership of objects being secured, e. g. , the registry keys 114, since having ownership of an object enables the owner to modify the corresponding ACL that secures the object as needed. In yet another variation of the embodiment, the system 100 employs a security subsystem that enables the user to take temporary ownership of the objects being secured, during which time the "owner"/user may temporarily modify the corresponding ACL as needed.

In one embodiment, once the protected value 108 has been unlocked, processing continues at process block 316 where the user choice setting process 102 generates a request to change a protected value for a user choice setting 120. At processing block 318, the transaction 120 can be acted on directly by the process 102, or can be sent to an existing API, such as the registry API 122. Either way, the system 100 changes the protected value for the user choice setting as requested by the application 110 and as approved by the user.

Once the protected value 108 has been modified, processing concludes at preparatory block 320, where the user choice setting process 102 locks the modified protected value by resetting the access control data 104 to allow only the operating system to write to the protected value 108 and to restrict the user to only reading the values, i. e., restoring the access restrictions that were imposed during the initialization process 302. In one embodiment, locking the modified protected value is accomplished by modifying the ACL that secures the registry key 112 to allow read-only access. In one embodiment, this may include returning temporary ownership of the access control data, such as the ACL, from the user to the system.

Figure 4:
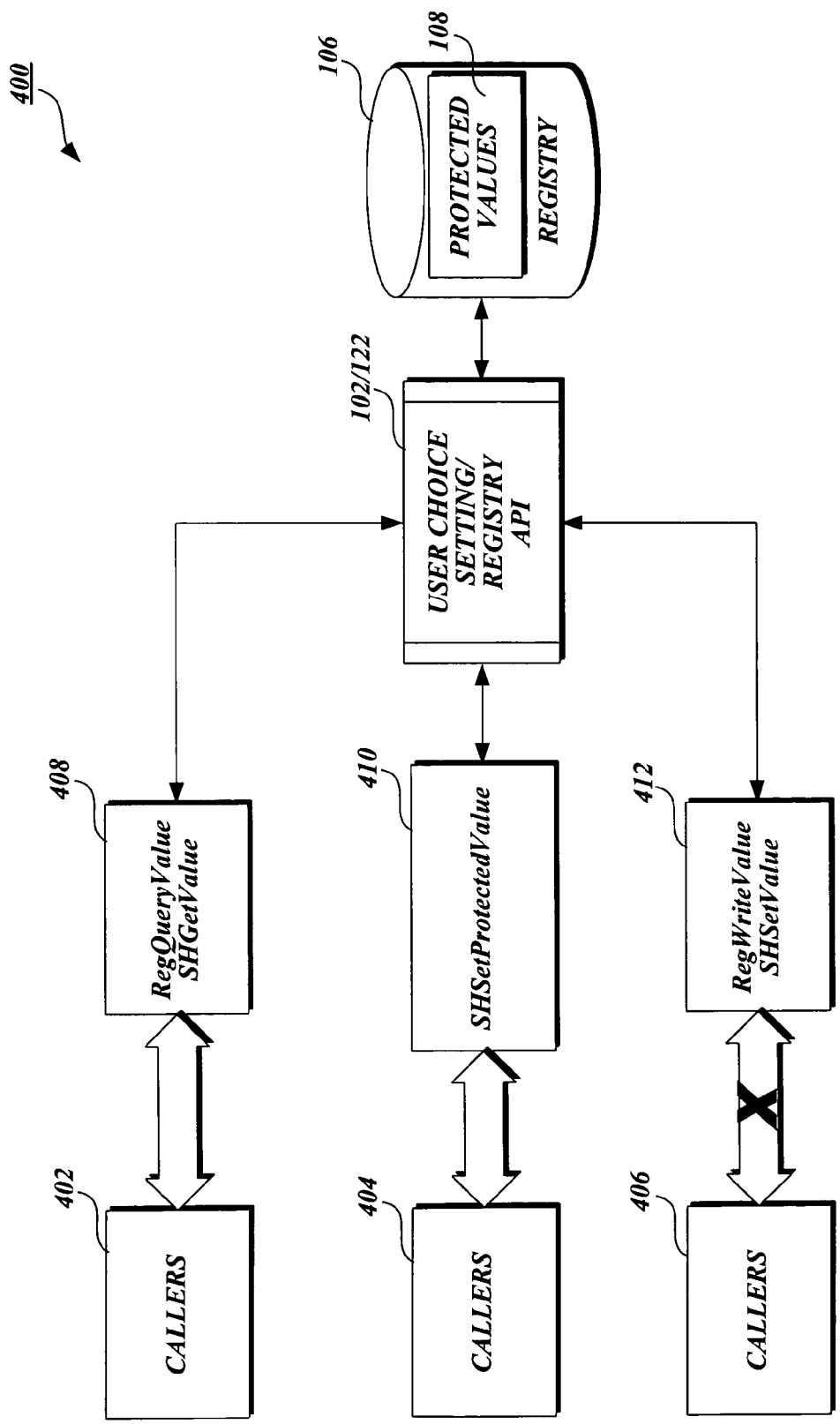
FIG. 4 is a block diagram of certain aspects of an exemplary user choice setting process for implementing an embodiment of the present invention.

FIG. 4 is a block diagram of certain aspects of an exemplary user choice setting process 102 for implementing an embodiment of the present invention. As illustrated, when callers 402 attempt to read protected values, such as when the process 102 reads the current value of a protected value on behalf of a requesting application 110, the read access is not denied. As shown in the illustrated embodiment, in the context of the Windows® operating system, the read access may be accomplished using the existing registry function, RegQueryValue, and shell registry function, SHGetValue.

When callers 404 attempt to write the protected values 108, the write access is allowed because the callers 404 are using a new shell registry function, SHSetProtectedValue 410, that implements the user choice setting process 102 to first modify the ACL to unlock the protected values 108 and to afterward modify the ACL to relock them.

However, when callers 406 attempt to write to the protected value 108 using existing registry functions 412 such as registry function RegWriteValue and shell registry function SHSetValue, the attempt fails because the access control data 104, e. g., the ACL, is applied using the existing registry storage functions. The existing registry functions do not have the ability to lock and unlock the protected values 108 as needed. In operation, the existing registry functions fail because they compare the current user's ID against the owner and privileges in the ACL, e. g., system write/user read, and deny the write operation.

Figure 5:
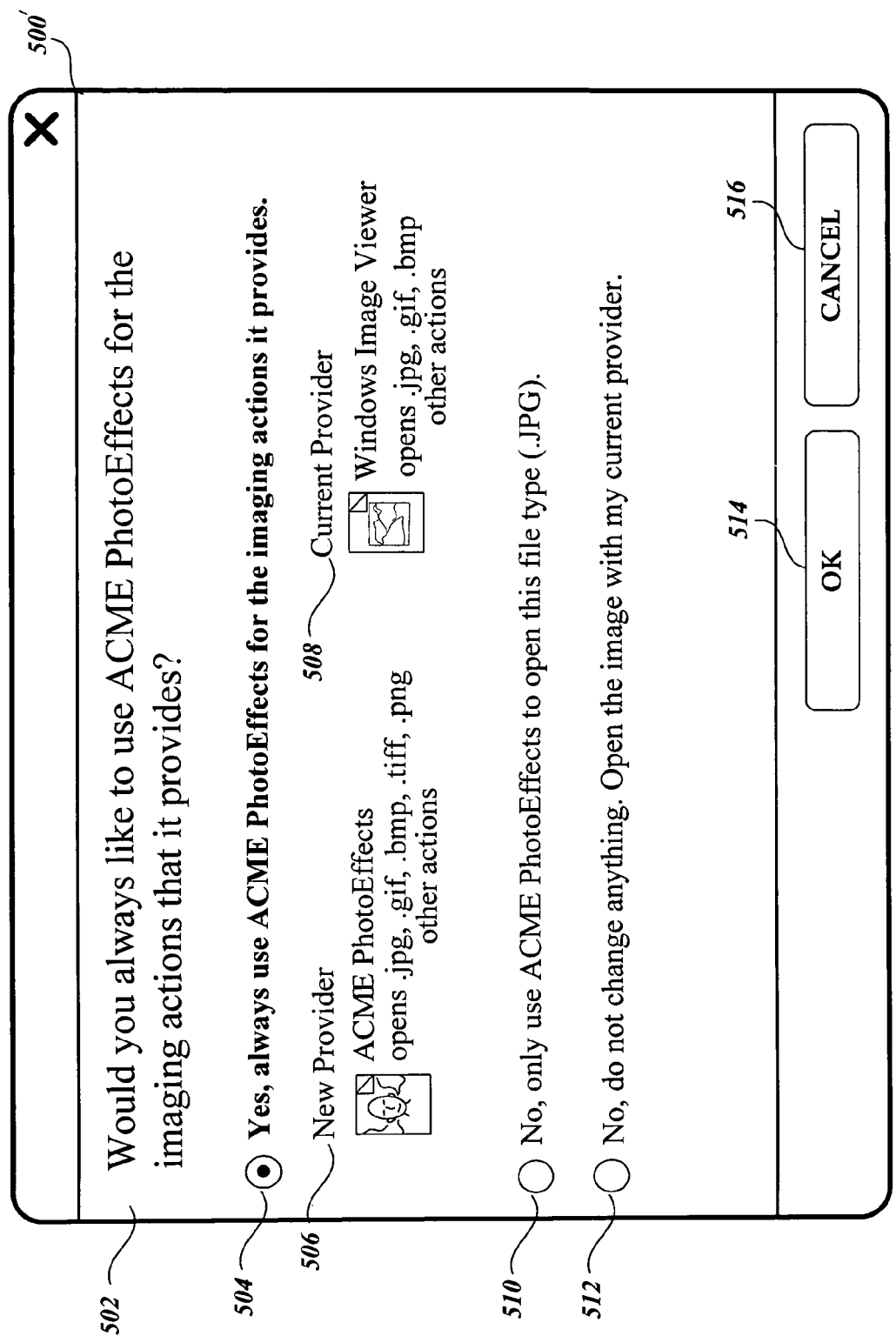
FIG. 5 is a pictorial diagram of an exemplary user choice setting user interface formed in accordance with an embodiment of the present invention.

FIG. 5 is a pictorial diagram of the exemplary user choice setting user interface 116 formed in accordance with an embodiment of the present invention. As shown, the user interface 116 comprises a window 500 in which is displayed the current values of certain user choice settings relating to an application 110. In the illustrated example, the application is the "ACME PhotoEffects" application. The window 500 includes a request 502 for user approval to potentially modify the user's preferences with respect to imaging actions, i. e., how the operating system opens . jpg, . gif, . bmp, and . tiff, files or other types of imaging actions. In the illustrated example, radio button 504 is checked, indicating that the user wants to protect his choice of ACME PhotoEffects 506 as the new default application to use for imaging actions, instead of the current provider, the Windows® Image Viewer 508. Depending on the application 110, alternative options may be displayed. In the illustrated example, other options include specifying the ACME PhotoEffects application as the default application only when processing . jpg files, and retaining the Windows® Image Viewer for all other files at radio button 510, or retaining the Windows® Image Viewer for all files at radio button 512. The window 500 may further include an "OK" command button at 514 to positively enter the user approval input, and a "CANCEL" command button at 516 to cancel the user approval input, effectively denying approval. It is understood that the example UI 116 in window 500 is for illustrative purposes only, and that numerous other interface designs may be employed when generating a user choice UI 116.

While the presently preferred embodiments of the invention have been illustrated and described, it will be appreciated that various changes may be made therein without departing from the spirit and scope of the invention. For example, in one embodiment of the present invention, the various components of the system to protect user choice settings 100 and, in particular, the functionality of the user choice setting process 102, as described with reference to the access control data 104 and the registry 106, may be implemented in different combinations of processes, programs, or interfaces, and may be distributed across one or more computing devices.

The embodiments of the invention in which an exclusive property or privilege is claimed are defined as follows:

1. A method for prioritizing user application preferences based on user input data, the method comprising:

recognizing, at a computing device of a user, user input data relevant to a first application as a prioritized user choice setting associated with the first application, wherein the prioritized user choice setting determines at least one property of execution of at least one event of the first application;

securing, at the computing device of the user, the user choice setting as a protected value using an access control indicator, wherein the access control indicator prohibits a second application from modifying the prioritized user choice setting associated with the first application without authorization from the user;

receiving, at the computing device of the user, a request from the second application to modify the prioritized user choice setting associated with the first application;

in response to receiving the request from the second application to modify the prioritized user choice setting associated with the first application, generating an approval user interface on the computing device of the user, the approval user interface requesting authorization from the user to modify the prioritized user choice setting associated with the first application to be consistent with the modification request received from the second application;

receiving, at the computing device of the user, input from the user approving the modification of the prioritized user choice setting associated with the first application to be consistent with the modification request received from the second application;

modifying, at the computing device of the user, the access control indicator to permit modification of the prioritized user choice setting associated with the first application to be consistent with the modification request received from the second application;

modifying, at the computing device of the user, the prioritized user choice setting to a different value in accordance with the received user input; and restoring, at the computing device of the user, the access control indicator to prohibit further modification by the second application of the prioritized user choice setting associated with the first application.

2. The method of claim 1, wherein the computing device of the user has an operating system with a registry, wherein the protected value is a registry key stored in the registry, wherein the access control indicator is an access control list (ACL) that has been initialized to prevent writing to the protected value, and wherein modifying the access control indicator includes modifying the access control indicator to permit writing to the protected value.

3. The method of claim 2, wherein the operating system also includes a security subsystem, and wherein modifying the access control indicator to permit writing to the protected value includes providing to the user rights to modify the ACL in accordance with the security subsystem of the operating system.

4. The method of claim 3, wherein modifying the access control indicator to permit writing to the protected value includes providing to the user ownership of the registry key that the ACL secures, and wherein ownership of the registry key automatically provides to the user rights to modify the ACL in accordance with the security subsystem of the operating system.

5. The method of claim 4, wherein providing to the user ownership of the registry key that the ACL secures includes temporarily providing to the ownership of the registry key that the ACL secures.

6. The method of claim 3,
wherein securing the prioritized user choice setting as a protected value using the access control indicator includes securing the prioritized user choice setting as a protected value using the access control indicator to prohibit the second application from writing to the protected value,
and wherein modifying the access control indicator to permit modification of the prioritized user choice setting associated with the first application to be consistent with the modification request received from the second application includes modifying the access control indicator to permit the second application to write to the protected value.

7. The method of claim 4, wherein restoring the access control indicator to prohibit further modification by the second application includes returning ownership of the registry key that the ACL secures to the operating system.

8. The method of claim 1, further comprising:
displaying, in association with the approval user interface, the prioritized user choice setting along with options for modifying the prioritized user choice setting,
wherein receiving input from the user approving the modification of the prioritized user choice setting comprises receiving input from the user in accordance with at least one of the displayed options.

9. The method of claim 1, further comprising generating a change notification when the prioritized user choice setting has been modified, the change notification identifying the second application and the prioritized user choice setting before and after the modification.

10. The method of claim 1, wherein the prioritized user choice setting includes at least one of a user preference relating to a file association, an autoplay setting, contents of a start menu, a registered client setting, a protocol handler, a MIME type handler, a task association, a Web browser home page, a reset Web page setting, and a sidebar setting.

11. The method of claim 10, wherein the prioritized user choice setting includes the registered client setting, and wherein the registered client setting includes at least one of a Web browser, e-mail, media player, instant messaging, and virtual machine for Java setting.

12. A system for storing user choice settings in a data repository to prevent undesired modifications to user choice settings, the system comprising:
a registry for storing a user choice setting associated with a first application as a protected value in a registry key, wherein the user choice setting determines at least one property of execution of at least one event of the first application, and wherein the user choice setting comprises at least one of a user preference relating to a file association, an autoplay setting, contents of a start menu, a registered client, a protocol handler, a MIME type handler, a task association, an internet explorer home page, a reset Web page setting, and a sidebar setting;
an access control list (ACL) to secure the registry key, wherein the ACL prevents the first application or another application from modifying the user choice setting associated with the first application; and
an approval user interface to control modifications to the user choice setting, wherein the approval user interface is generated on a computing device of the user in response to receiving a request from the first application or another application to modify the user choice setting, and wherein the approval user interface, upon obtaining approval to modify the user choice setting, modifies the ACL to permit writing to change the protected value in the registry key to a modified user choice setting.

13. The system of claim 12:
wherein the approval user interface restores the ACL to prevent writing to the protected value in the registry key after writing the modified user choice setting,
and wherein the approval user interface notifies the user whenever the approval user interface writes to the protected value, including notifying the user of a content of the protected value before and after the approval user interface writes to the protected value and an identity of the application that requested the modification.

14. The system of claim 13, wherein the user choice setting comprises a registered client setting, and wherein the registered client setting includes at least one of a Web browser, e-mail, media player, instant messaging, and virtual machine for Java setting.

15. The system of claim 12, wherein the computing device of the user includes an operating system having a security subsystem, and wherein the security subsystem modifies the ACL to permit the first application or another application to modify the user choice setting associated with the first application upon receiving user approval of the request to modify the user choice setting.

16. The system, of claim 12, wherein the security subsystem modifies the ACL to permit writing to the protected value in the registry key by providing to the user ownership of the registry key, wherein ownership of the registry key automatically provides to the user rights to modify the ACL in accordance with the security subsystem of the operating system.

17. The system of claim 12, wherein the security subsystem modifies the ACL to permit writing to the protected value in the registry key includes by providing to the user temporary ownership of the registry key, wherein temporary ownership of the registry key automatically provides to the user rights to temporarily modify the ACL in accordance with the security subsystem of the operating system.

18. Computer-accessible storage devices having components for performing a method of safely modifying user application preferences for when and how an application is to operate on a computer of a user, the method comprising:
recognizing user input data relevant to the application as a prioritized user choice setting, wherein the prioritized user choice setting determines at least one property of execution of at least one event of the application;
securing the prioritized user choice setting as a protected value using an access control indicator, wherein the access control indicator prohibits the application from modifying the prioritized user choice setting;

receiving a request from the application to modify the prioritized user choice setting;

in response to the request from the application to modify the prioritized user choice setting, generating an approval user interface requesting authorization from the user to modify the prioritized user choice setting in accordance with the modification request received;

receiving input from the user approving modification of the prioritized user choice setting associated with the application to be consistent with a value stated in the request received from the application;

modifying the access control indicator to permit modification of the prioritized user choice setting associated with the application to match the value stated in the request received from the application;

modifying the prioritized user choice setting to match the value stated in the request received from the application in accordance with the received user input;

restoring the access control indicator to prohibit further modification of the prioritized user choice setting; and generating a change notification to the user once the prioritized user choice setting has been modified.

19. The devices of claim 18, wherein the computer of the user includes an operating system having a registry, wherein the protected value is a registry key stored in the registry, wherein the access control indicator an access control list (ACL) that has been initialized to prevent writing to the protected value, and wherein modifying the access control indicator includes modifying the access control indicator to permit writing to the protected value.

20. The devices of claim 19, wherein the operating system also includes a security subsystem, and wherein modifying the access control indicator to permit writing to the protected value includes providing to the user rights to modify the ACL in accordance with the security subsystem of the operating system.

21. The devices of claim 20, wherein modifying the access control indicator to permit writing to the protected value includes providing to the user ownership of the registry key that the ACL secures, and wherein ownership of the registry key automatically provides to the user rights to modify the ACL in accordance with the security subsystem of the operating system.

22. The devices of claim 19, wherein providing to the user ownership of the registry key that the ACL secures includes temporarily providing to the user ownership of the registry key that the ACL secures.

23. The devices of claim 20, wherein modifying the access control indicator to permit modification of the prioritized user choice setting associated with the application to be consistent with the modification request received includes requiring user to modify the access control indicator to permit writing to the protected value in accordance with the security subsystem of the operating system.

24. The devices of claim 23, wherein restoring the access control indicator to prohibit further modification of the prioritized user choice setting includes returning ownership of the registry key that the ACL secures to the operating system.

25. The media of claim 18, wherein the change notification identifies the application and the contents of the prioritized user choice setting before and after the modification.

26. The devices of claim 18, wherein the user choice setting includes at least one of a user preference relating to a file association, an autoplay setting, contents of a start menu, a registered client setting, a protocol handler, a MME type handler, a task association, a Web browser home page, a reset Web page setting, and a sidebar setting.

27. The devices of claim 26, wherein the prioritized user choice setting includes the registered client setting, and wherein the registered client setting includes at least one of a Web browser, e-mail, media player, instant messaging, and virtual machine for Java setting.

* * * * *